United States Patent Office 3,784,499
Patented Jan. 8, 1974

3,784,499
NONFLAMMABLE COATING COMPOSITIONS
Albert C. Krupnick, Huntsville, and Carlo F. Key, Madison, Ala., and Roger J. Harwell, Ardmore, Tenn., assignors to the United States of America as represented by the Administrator of the National Aeronautics and Space Administration
No Drawing. Continuation-in-part of abandoned application Ser. No. 84,212, Oct. 26, 1970. This application Sept. 26, 1972, Ser. No. 292,382
Int. Cl. C09d 1/04, 5/18
U.S. Cl. 260—29.6 S
10 Claims

ABSTRACT OF THE DISCLOSURE

Nonflammable coating compositions for use in high-oxygen environments include an aqueous suspension of synthetic mica, an alkali metal silicate gelant and a water-base "latex" resin emulsion. Inorganic white and/or color pigments and additives such as glass microballoons are employed to provide a wide range of colors and optical properties.

CROSS REFERENCE TO RELATED APPLICATION

This application is a continuation-in-part of application Ser. No. 84,212, filed Oct. 26, 1970, now abandoned.

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

This invention relates to coatings and more particularly to nonflammable coating compositions.

Coatings for use in contact with liquid oxygen or high-oxygen gaseous atmospheres must be nonflammable to avoid a severe fire and safety hazard. This requirement is of critical importance for manned spacecraft applications and for orbital facilities such as manned laboratories or workshops which employ a high oxygen or pure oxygen life-support environment. Coatings capable of providing a wide range of colors and reflectance properties are needed for esthetic as well as functional purposes in space vehicles and facilities for long-duration manned missions.

Coatings based on an organic vehicle or binder, for example, previously known oil-base and water-base paints, generally fail to show the required nonflammability for use in a pure oxygen atmosphere, even when fire-retardant additives are employed. Inorganic coatings avoid the problem of flammability, but most inorganic coatings present disadvantages in their difficulty of application and curing and in their mechanical properties and adhesion of the coating film. Thermal and mechanical stresses are especially severe for coatings in contact with liquid oxygen or other cryogenics so that superior mechanical properties are required.

An improved inorganic coating based on an aqueous suspension of synthetic mica and a silicate gelant is disclosed in copending application Ser. No. 813,338, filed Apr. 3, 1969, now U.S. Pat. No. 3,620,791 and assigned to a common assignee. Mica-silicate coatings of this type are nonflammable and resistant to solar radiation in vacuum so that they can be used for coating external surfaces of spacecraft. However, these coatings are somewhat impractical and difficult to work with in that complete curing requires holding for about 8 hours at a relatively high temperature (250° F.) or a much longer period at lower temperatures. In addition, adhesion of the coating to metal surfaces and flexibility of the coating film need improvement for some applications.

SUMMARY OF THE INVENTION

The coating compositions of the present invention are based on an aqueous suspension of synthetic mica or reactive fluorolithosilicate and a soluble metal silicate or sulfate gelant intermixed with a water-base "latex" resin-emulsion. Inorganic pigments and additives such as zinc oxide or color pigments and glass microballons are included to provide the desired color and optical characteristics. Coating compositions embodying the invention are nonflammable in contact with liquid oxygen and high-oxygen gaseous environments. Curing of these compositions can be carried out at a considerably lower temperature than for the previous mica-silicate coatings, and mechanical properties, in particular adhesion and film flexibility, are improved. Color and reflectance properties can be adjusted over a wide range by varying the pigments and additives used.

It is therefore an object of this invention to provide coating compositions that are nonflammable in the presence of liquid oxygen and high-oxygen gaseous environments.

Another object is to provide nonflammable coating compositions which are curable at a relatively low temperature.

Still another object is to provide nonflammable coating compositions characterized by strong adhesion and high flexibility of the coating film.

Other objects and advantages of the invention will be apparent from the following detailed description and appended claims.

DESCRIPTION OF THE PREFERRED EMBODIMENT

Coating compositions embodying the present invention are based on the combination of an inorganic aqueous suspension of synthetic mica or reactive fluorolithosilicate and a soluble silicate or sulfate gelant therefor with an aqueous organic resin emulsion. The proportion of inorganic suspension to resin emulsion is controlled so as to obtain the nonflammability of inorganic coatings consistent with the lower-temperature curing and superior mechanical properties of organic-resin-based systems, and for most applications a weight proportion of about .9:1 to 1.5:1 can be used, based on a four weight percent suspension of synthetic mica in comparison to an aqueous resin emulsion containing 40.8 weight percent of a vinyl acetate-dibutyl maleate copolymer resin. The resulting suspension-emulsion, after being thinned to a suitable consistency with water, can itself be employed as a coating; however, in most cases other components including pigments and glass microspheres will be added to provide the desired optical properties and color.

The inorganic suspension component can be a reactive synthetic mica or a fluorolithosilicate mineral of the tri-octahedral montmorillonite type. These materials are characterized by their physical form of extremely thin platelets, their excellent capability for film formation in aqueous suspension and their high degree of chemical reactivity, owing to the presence of low-atomic-number metals and fluorine atoms. Synthetic micas which can be used are exemplified by the formula

where M is sodium or lithium. This material is obtained by chemical modification of naturally occurring micas such as phlogopite. Although they have the same crystal structure as synthetic mica, most naturally occurring micas are not suitable without chemical modification because of their low reactivity, which results from a relatively high content of aluminum or potassium atoms. In the synthetic micas, these atoms are at least partially replaced by the more reactive lithium, and hydroxy groups are replaced by fluorine atoms. An aqueous suspension of synthetic mica having the formula given above is available commercially from Minnesota Mining and Manufacturing Company under the designation "HX–610" in the form of irregular platelets 20 to 100 angstroms thick and having diameters greater than 100 times their thickness. Naturally occurring minerals of the trioctahedral montmorillonite type which can be used are exemplified by the mineral hectorite, a sodium-magnesium-fluorolithosilicate having the formula

where M is sodium or lithium. This material is available commercially under the designation "Macloid," its ultimate particle size being colloctial (less than 1 micron) and its surface 600 square meters per gram.

The synthetic mica described above is preferred, and the invention will be described in detail below with reference thereto. However, it is to be understood that the fluorolithosilicate is substantially equivalent to the synthetic mica and produces similar results when used at the same proportion. Although not critical, the starting synthetic mica suspension concentration is normally about four weight percent.

Gelation of the synthetic mica suspension is enabled by providing a soluble metal silicate or sulfate in the composition. The soluble metal silicate can be a silicate of an alkali metal such as sodium, lithium or potassium or aluminum silicate (mullite), with potassium silicate being preferred. Best results are obtained by using a potassium silicate solution having a solids content of 35 to 40 weight percent, the weight ratio of silica to potassium oxide of the silicate being 2.1:1. An aqueous solution of a sulfate of an alkali metal such as sodium, lithium or potassium or an alkaline earth metal such as calcium or magnesium, as well as aluminum sulfate, can be used instead of the silicate solution.

The gelant solution in the case of potassium silicate is preferably provided at a weight proportion of about 0.84:1, based on the amount of a 35 weight percent solids potassium silicate solution in comparison to a four weight percent synthetic mica suspension, and a similar proportion, adjusted for differences in atomic weights, can be used for other silicates. For sulfate gelants a lesser amount such as 0.25 to 0.32 weight percent of the total binder components can be used. The amount of gelant can be increased to produce higher hardness in the coating, but the coating may also become more brittle.

Although the resin component of the aqueous organic emulsion can be any polymeric resin of the types employed as the principal binder ingredient of "latex" paints or coatings, it is preferred to use a polyvinyl acetate resin, and in particular a copolymer of vinyl acetate with dibutyl maleate. The term "vinyl acetate polymer" as used herein is intended to refer to a class of polymeric resin systems including both copolymers and homopolymers having recurring vinyl acetate units, a further description of such systems being available in the book "Formulation of Organic Coatings" by Norman I. Gaynes, D. Van Nostrand Company (1967). Polyvinyl acetate by itself produces an unduly hard coating, and in order to obtain the desired coating properties copolymerization with another monomer or addition of a plasticizer is normally employed. Examples of suitable plasticizers for polyvinyl acetate homopolymer include butyl phthalate, tricresyl phosphate and butyl benzyl phthalate. Monomers which can be polymerized with vinyl acetate to obtain a suitable copolymer include dibutyl maleate, butyl acrylate, dibutyl fumarate, dioctyl maleate, vinyl propionate, vinyl caprate and octyl acrylate. In addition to poly-vinyl acetate resins, other resins such as styrene-butadiene and acrylic resins can also be used within the scope of the invention.

"Latex" paint formulations normally include several other components in addition to the resin emulsion, and formulations containing these additives can be used in the present invention. Typical "latex" paint formulations include the following: pigments such as zinc oxide or titanium dioxide for white paints and selected color pigments along with extender pigments such as calcium carbonate or calcium silicate; a cellulosic thickner such as carboxymethylcellulose; a pigment dispersing agent, normally as anionic material such as alkyl benzyl sulfonate or complex phosphate such as potassium tripolyphosphate; a wetting agent which can be a nonionic condensation product of ethylene oxide and various fatty acids or alcohols; an antifoaming agent such as tri-n-butyl phosphate; a freeze-thaw stabilizer such as ethylene glycol, a fungicide such as phenyl mercuric acetate; and a coalescing agent such as diethylene glycol monoethyl ether acetate or dibutyl phthalate. Such additives, except for the pigment, are normally provided in relatively minor proportions and collectively they comprise up to about five weight percent of "latex" paint formulations.

Although pigmented "latex" paint can be employed in the present invention, it is preferred to use an unpigmented "latex" formulation and to add specified pigments and other reflectance-producing additives to the mixture of mica, gelant and resin emulsion "latex" as required for the desired color and reflectance. This approach provides more precise control over colors and reflectance properties and enables better reproducibility. An example of a suitable unpigmented "latex" emulsion is a copolymer of vinyl acetate and dibutyl maleate available commercially under the designation "Glidden 5011 Latex Overcoating" which formulation contains 40.8 weight percent of the copolymer resin and 2.8 weight percent silica. Best results are obtained by combining this material with the mica-gelant mixture at a proportion of 1.1:1, based on the weight of the resin emulsion in comparison to a four percent by weight mica suspension. Higher amounts of "latex" emulsion can be used up to a ratio of about 1.5:1, but above this value the coating loses its nonflammability. Lower proportions down to .9:1, can also be used, but as the amount of "latex" is decreased the required curing temperature increases and mechanical properties are less favorable.

The mica suspension, gelant solution and resin emulsion mixture can be used without any pigment where only a protective coating is desired without regard to color and reflectance properties. However, for most applications it is preferred to include pigments and a reflectance-promoting additive. The basic coating is broadly compatible with conventional pigments, and in particular the usual white pigments such as zinc oxide, titanium dioxide, antimony trioxide and zirconium oxide can be used. Zinc oxide prepared by calcining at a temperature of 600 to 700° C. for 16 hours and having a mean particle size of about 0.6 micron is preferred. The desired color, tone and hue can be obtained by including color pigments and preferably inorganic materials such as metal oxides or oxide complexes. For black or gray coatings carbon black can be used. Best results are obtained by including a sufficient amount of pigment to provide a total pigment volume concentration within the range of 18 to 23 percent, depending on the pigment used.

In order to provide improved reflectance, and for space applications, to decrease coating weight without loss of quality, and to improve radiation stability and abrasion resistance, a portion of the pigment can be replaced by reflectance-promoting additive such as hollow glass microspheres, commonly referred to as microballoons. Minimum particle size microspheres are preferred, in particular those having a diameter less than five microns, although commercially available microspheres having a diameter of about 35 to 45 microns can also be used. The glass microspheres are interspersed with smaller particles of zinc oxide in the coating so as to provide maximum hiding power. For white coating a preferred pigment-glass microsphere combination is 10 to 20 volume percent zinc oxide and the balance glass microspheres.

Finally, water is included in the mixture to provide the desired consistency. In general sufficient water should be added to provide a total solids content of 28 to 34 percent by weight.

cate solution (35 weight percent solids, silica to potassium oxide weight ratio 2.1:1), 13.1; glass microspheres (35 to 45 microns in diameter) "B-35A," 3.4; pigment 19.5; distilled water 34.1 and unpigmented vinyl acetatedibutyl maleate copolymer resin emulsion, "#5011 Glidden Latex" (40.8 weight percent copolymer and 2.8 weight percent silica), 14.3. For white coatings zinc oxide pigment is used, and by replacing all or part of the zinc oxide with various color pigments a wide range of colors can be obtained as shown by the following table.

"MICATEX" COATINGS
Pigment content in weight percent of total pigment

| Pigment[1] | Light yellow | Yellow beige | Light blue | Medium blue | Bright blue | Orange | Dark yellow | Off white | Red | White | Black | Gray | Dark blue | Bright yellow |
|---|---|---|---|---|---|---|---|---|---|---|---|---|---|---|
| Zinc oxide | 95.8 | 93.8 | 98.5 | 93.7 | 71 | 50 | 74.7 | 98 | 44 | 100 | | 68 | 47 | |
| Yellow 11 | 4.0 | | 0.7 | 1.3 | | | 12.0 | 1.5 | | | | | | 97 |
| Yellow 29 | 0.2 | 5.7 | | | | | 8.1 | | | | | | | |
| Brown 45 | | 0.5 | | | | | 3.9 | 0.5 | | | | | | |
| Blue 34 | | | 0.8 | | | 23 | | | | | | | | |
| Blue 9 | | | | 4.6 | | | | | | | | | | |
| Blue 3 | | | | 0.4 | | | | | | | | | 47 | |
| Blue 1 | | | | | 6 | | | | | | | | | |
| Orange 61 | | | | | | 50 | | | | | | | | 3 |
| Red 6476 | | | | | | | | | 31 | | | | | |
| Red 67 | | | | | | | 0.8 | | 25 | | | | | |
| Red 63 | | | | | | | 0.5 | | | | | | | |
| Black 1 | | | | | | | | | | | 100 | 32 | 6 | |

[1] Pigment numbers refer to the Shepherd Chemical Company pigment number designations.

In order to insure homogeneity the components listed above are intimately mixed prior to application. In a preferred procedure mixing is carried out in a porcelain ball mill using balls 0.75 inch in diameter and a volume ratio of balls to material of 1:2. Suitable milling is obtained after three hours at approximately 70 percent critical speed, which is given by the formula $$\text{r.p.m.} = 54.2/\sqrt{\text{mill radius (ft.)}}$$

where the radius of the mill is its inside dimension. The mixture is then blended in a "Waring Blender" for five minutes. Preferably the mixture is initially prepared or thoroughly re-mixed just prior to use.

The mixed formulation can be applied to any surface such as wood, metal, concrete, wall board or the like requiring a coating for protective or esthetic purposes. Metal surfaces should be pre-treated by sand blasting, for example with 80–100 grit silica at 40 p.s.i.a., and cleaning with a detergent cleaner and a solvent such as acetone to insure maximum adhesion. Application by spraying is preferred, although other means such as brushes or rollers can be used. In a preferred procedure the mixture is sprayed onto a substrate at a distance of 12 to 15 inches until a reflection due to liquid is apparent, after which the sprayed mixture is air-dryed until the gloss disappears and the cycle is repeated. A wet thickness of 4 to 5 mils is achieved per cycle until the total wet thickness is 15 to 18 mils. When cured the resulting dry thickness will be 5 to 6 mils. Additional coats can be applied as desired.

Following air-drying at room temperature, the coating becomes tack-free and will eventually cure to moderate hardness. However, it is preferred to insure complete curing by holding at a temperature of 160° F. Best results are obtained by a curing cycle comprising 48 hours at room temperature, followed by 72 hours at 160° F. Such curing cycle results in a surface having a better abrasion resistance than normal latex paints.

A preferred formulation for space workshop coating applications is made up of the following components, in weight percent: synthetic mica suspension (4.1 weight percent solids content) "HX–610," 15.6; potassium sili- Coatings produced by application of the above-described compositions to a substrate and curing at room temperature for 48 hours and at 160° F. for 72 hours show excellent overall properties. All compositions are nonflammable in contact with liquid oxygen and pure oxygen atmospheres. Coated metal panels, concrete blocks, cement and wall board, after being subject to exterior weathering conditions for ten months, showed no signs of cracking or peeling and their color fastness was equal to or better than is shown by conventional exterior paints. Shelf life of these compositions when stored in air-tight containers at room temperature exceeds twelve months. Hardness of the coating film was determined to be 3H pencil hardness. Thermal cycling from liquid nitrogen temperature to 180° F. and contact with liquid oxygen, and hydrogen resulted in no change to coated samples. The coatings were also shown to meet toxicity and off-gassing requirements for space use in accordance with MSFC Specification 101A. With regard to optical properties, the white coating showed an emissivity of 0.8 and solar absorptivity of 0.16 to 0.30, depending on film thickness. Although these coatings show excellent resistance to moisture, they are porous and will not present a barrier to corrosion under salt spray conditions. For use in salt atmospheres the coating should be sealed with a fluorocarbon such as Kel–F 800 or the underlying metal surface given a corrosion-resistant treatment, in the case of aluminum alloys, alodining or sulfuric acid anodizing.

It is to be understood that various changes and modifications may be made to the formulations described above without departing from the spirit and scope of the invention.

What is claimed is:
1. A curable coating composition comprising a finely divided, homogeneous mixture of an aqueous suspension of sodium magnesium fluorolithosilicate or a synthetic mica substantially free of potassium and aluminum and a gelant therefor comprising a soluble metal silicate or metal sulfate solution and an aqueous vinyl acetate polymer emulsion.

2. The composition of claim 1 wherein said vinyl acetate polymer is a copolymer of vinyl acetate and dibutyl maleate.

3. The composition of claim 2 wherein said aqueous suspension consists of water and a synthetic mica having the formula MMg$_2$LiSi$_4$O$_{10}$F$_2$ where M is sodium or lithium.

4. The composition of claim 3 wherein said gelant consists of an aqueous solution of potassium silicate.

5. The composition of claim 4 wherein the weight ratio of said aqueous suspension of synthetic mica to said organic resin emulsion is .9:1 to 1.5:1, based on a synthetic mica content in said suspension of four weight percent and an organic resin content in said emulsion of 41.8 weight percent.

6. The composition of claim 5 wherein the weight ratio of said potassium silicate solution to said aqueous synthetic mica suspension is about 0.84:1, based on a potassium silicate solution having a solids content of 35 weight percent.

7. The composition of claim 4 including an inorganic pigment at a pigment volume concentration of 18 to 23 percent.

8. The composition of claim 7 wherein said pigment is zinc oxide.

9. The composition of claim 4 including 18 to 23 volume percent of reflectance-promoting mixture consisting of 10 to 20 volume percent of an inorganic pigment and the balance hollow glass microspheres.

10. A curable, liquid-oxygen-compatible coating composition consisting essentially of a mixture of the following components, in weight percent:

(a) Aqueous synthetic mica suspension, 4.1 weight percent solids content _____ 15.6
(b) Aqueous potassium silicate solution, 35 weight percent solids content _____ 13.1
(c) Hollow glass microspheres, 35 to 45 microns in diameter _____ 3.4
(d) Inorganic pigment _____ 19.5
(e) Aqueous emulsion of a copolymer of vinyl acetate and dibutyl maleate, 40.8 weight percent resin content, containing 2.8 weight percent silica _____ 14.3
(f) Water in addition to water content of suspension and emulsion _____ 34.1

References Cited
UNITED STATES PATENTS

| | | | |
|---|---|---|---|
| 2,536,375 | 1/1951 | Koehn et al. | 260—29.6 |
| 3,223,163 | 12/1965 | Koch et al. | 166—33 |
| 3,437,625 | 4/1969 | Bonnel et al. | 260—29.4 |
| 3,450,661 | 6/1969 | Neel et al. | 260—29.6 |
| 3,483,156 | 12/1969 | Mills et al. | 260—29.6 |
| 3,522,068 | 7/1970 | Bastian et al. | 106—87 |

OTHER REFERENCES

Chem. Abstracts 60, 767d (1964).

WILLIAM SHORT, Primary Examiner

E. A. NIELSEN, Assistant Examiner

U.S. Cl. X.R.

117—123 D, 135.1, 137